United States Patent
Durance et al.

(10) Patent No.: US 11,547,131 B2
(45) Date of Patent: Jan. 10, 2023

(54) METHOD OF MAKING DRIED FOOD PRODUCTS

(71) Applicant: ENWAVE CORPORATION, Delta (CA)

(72) Inventors: Timothy D. Durance, Vancouver (CA); Guopeng Zhang, Surrey (CA)

(73) Assignee: ENWAVE CORPORATION, Vancouver (CA)

( * ) Notice: Subject to any disclaimer, the term of this patent is extended or adjusted under 35 U.S.C. 154(b) by 814 days.

(21) Appl. No.: 15/768,439

(22) PCT Filed: Oct. 14, 2015

(86) PCT No.: PCT/CA2015/051034
§ 371 (c)(1),
(2) Date: Apr. 13, 2018

(87) PCT Pub. No.: WO2017/063068
PCT Pub. Date: Apr. 20, 2017

(65) Prior Publication Data
US 2018/0325149 A1 Nov. 15, 2018

(51) Int. Cl.
*A23L 3/365* (2006.01)
*A23L 3/54* (2006.01)
(Continued)

(52) U.S. Cl.
CPC ............... *A23L 3/365* (2013.01); *A23C 1/00* (2013.01); *A23J 3/14* (2013.01); *A23J 3/16* (2013.01);
(Continued)

(58) Field of Classification Search
CPC .......... A23L 11/07; A23L 35/15; A23L 35/34; A23L 11/05; A23L 11/09; A23B 4/037;
(Continued)

(56) References Cited

U.S. PATENT DOCUMENTS 3,922,359 A * 11/1975 Hashizume ............... A23J 3/24
426/574
4,298,628 A * 11/1981 Nagata ...................... A23J 3/16
426/656

(Continued)

FOREIGN PATENT DOCUMENTS

CA 1217376 A 2/1987
CA 2265207 C 9/1999
(Continued)

OTHER PUBLICATIONS

Fermented Tofu NPL, published Mar. 17, 2015, https://web.archive.org/web/20150317020827/https://omnivorescookbook.com/pantry/fermented-tofu (Year: 2015).*
(Continued)

*Primary Examiner* — Erik Kashnikow
*Assistant Examiner* — Bryan Kim
(74) *Attorney, Agent, or Firm* — Nyemaster Goode P.C.

(57) ABSTRACT

A process for making a shelf-stable food, not requiring preservatives or refrigeration and in a form that is convenient for use as a snack food. A block of tofu or wheat gluten is first frozen so as to cause the formation of ice crystals that form cavities within the block. The frozen block is then thawed, cut into smaller pieces and drained of excess water. The thawed pieces are dried in a microwave-vacuum dehydrator to produce a crunchy food product.

20 Claims, 1 Drawing Sheet

(51) Int. Cl.
  *A23J 3/14* (2006.01)
  *A23C 1/00* (2006.01)
  *A23L 3/36* (2006.01)
  *A23L 11/45* (2021.01)
  *A23J 3/16* (2006.01)
  *A23J 3/18* (2006.01)

(52) U.S. Cl.
  CPC . *A23J 3/18* (2013.01); *A23L 3/36* (2013.01); *A23L 3/54* (2013.01); *A23L 11/45* (2021.01); *A23V 2002/00* (2013.01)

(58) Field of Classification Search
  CPC . A23B 4/07; A23B 7/024; A23B 7/045; A23J 3/14; A23J 3/16; A23J 3/18; A23J 3/22; A23J 3/225; A23J 3/227; A23J 3/24; A23J 3/26; A23C 1/06; A23C 1/08; A23C 20/005; A23C 20/025
  See application file for complete search history.

(56) References Cited

U.S. PATENT DOCUMENTS

| | | | | |
|---|---|---|---|---|
| 4,664,924 | A * | 5/1987 | Sugisawa | A23L 3/01 |
| | | | | 219/734 |
| 4,948,609 | A * | 8/1990 | Nafisi-Movaghar | A23B 7/024 |
| | | | | 426/321 |
| 5,811,150 | A * | 9/1998 | Morikawa | A23J 3/24 |
| | | | | 426/524 |
| 9,521,856 | B2 * | 12/2016 | Kang | A23C 20/025 |
| 2004/0028798 | A1 * | 2/2004 | Adachi | A23L 3/361 |
| | | | | 426/629 |
| 2005/0255206 | A1 * | 11/2005 | Fukasawa | A23B 4/033 |
| | | | | 426/385 |
| 2008/0102168 | A1 * | 5/2008 | Borders | A23L 7/10 |
| | | | | 426/72 |
| 2008/0179318 | A1 * | 7/2008 | Cornwell | A23B 7/02 |
| | | | | 219/686 |
| 2013/0164429 | A1 | 6/2013 | Stromotich et al. | |
| 2013/0243913 | A1 | 9/2013 | Gao et al. | |
| 2013/0287909 | A1 * | 10/2013 | Lewis | A23B 7/01 |
| | | | | 426/242 |
| 2014/0072672 | A1 * | 3/2014 | Nisbet | A23B 7/024 |
| | | | | 426/72 |

FOREIGN PATENT DOCUMENTS

| | | |
|---|---|---|
| CA | 2235694 C | 10/1999 |
| CA | 2657130 C | 1/2008 |
| CA | 2597631 C | 5/2008 |
| CA | 2673589 C | 8/2008 |
| CA | 2703675 C | 4/2009 |
| CA | 2806072 A1 | 1/2012 |
| CA | 2832709 A1 | 10/2012 |
| CN | 1672531 A | 9/2005 |
| CN | 1849921 A | 10/2006 |
| CN | 101214068 A | 7/2008 |
| CN | 101433228 A | 5/2009 |
| CN | 101869133 A | 10/2010 |
| CN | 101953402 A | 1/2011 |
| CN | 102823887 A | 12/2012 |
| EP | 0650668 A1 | 5/1995 |
| GB | 2209114 A | 5/1989 |
| WO | 2012153932 A2 | 11/2012 |
| WO | 2012153933 A2 | 11/2012 |
| WO | 2012153934 A2 | 11/2012 |
| WO | 2012153936 A2 | 11/2012 |
| WO | 2013108697 | 7/2013 |
| WO | 2013151176 | 10/2013 |

OTHER PUBLICATIONS

Lifehacker NPL, published Sep. 11, 2015, https://lifehacker.com/freeze-tofu-for-a-firmer-chewier-texture-1729960142 (Year: 2015).*

Yummy NPL, published Oct. 31, 2011, https://www.yummy.ph/recipe/baked-tofu-chips (Year: 2011).*

Shurtleff et al., "History of Tofu," Soy Info Center, accessed from http://www.soyinfocenter.com/HSS/tofu1.php, 2004, 8 pages.

Enwave Corporation, "The Global Leader in Vacuum-Microwave Drying," accessed from http://www.enwave.net, Jun. 28, 2016, 9 pages.

International Searching Authority, "Search Report and Written Opinion," issued in connection with International Application No. PCT/CA2015/051034, dated Apr. 20, 2017, 8 pages.

International Searching Authority, "International Preliminary Report on Patentability," issued in connection with International Application No. PCT/CA2015/051034, dated Apr. 17, 2018, 5 pages.

* cited by examiner

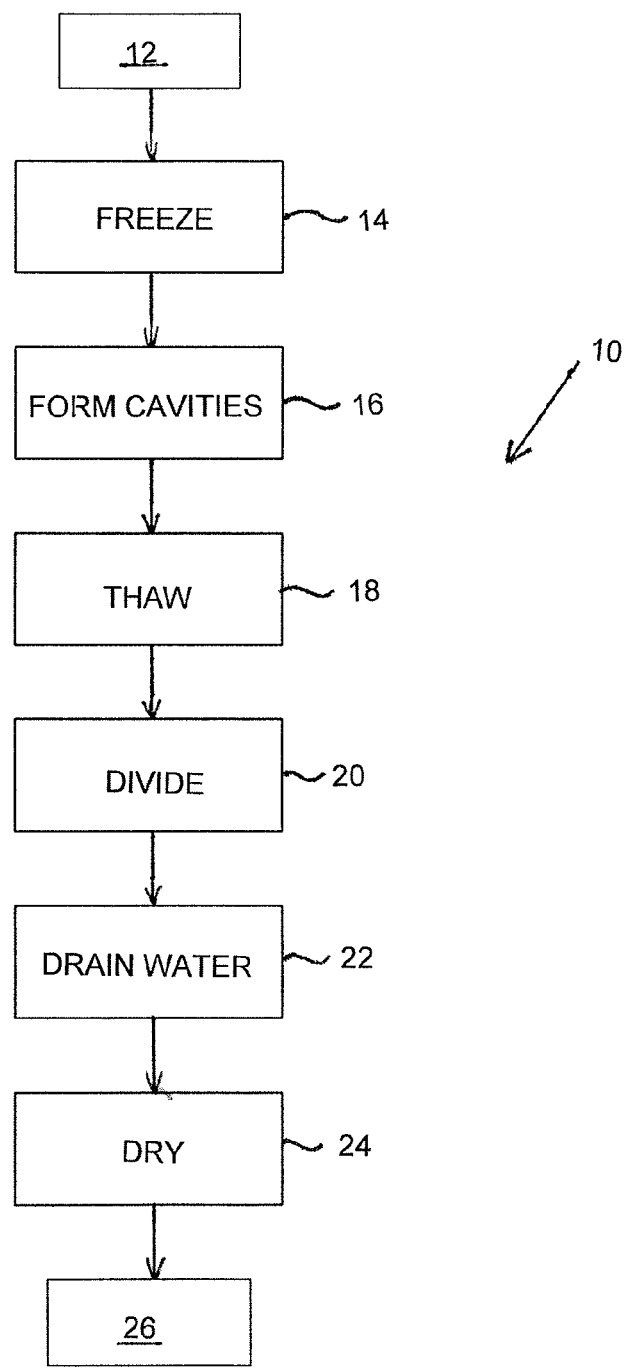

METHOD OF MAKING DRIED FOOD PRODUCTS

FIELD OF THE INVENTION

The invention pertains to dried tofu-based and wheat gluten-based food products and methods of making them.

BACKGROUND OF THE INVENTION

Tofu, also known as bean curd, is a common food in Western and Eastern diets. It is made by coagulating soy milk and is sold in a variety of fresh and processed forms. However, in most of its forms, it requires refrigeration or further treatment and is not convenient to use as a ready-to-eat snack food. Wheat gluten is a food made from wheat and it is sometimes used as an alternative to tofu. It likewise requires further processing and is not convenient to use as a ready-to-eat snack food.

SUMMARY OF THE INVENTION

The invention provides a shelf-stable food, not requiring preservatives or refrigeration and in a form that is convenient and desirable for use as a snack food.

One aspect of the invention provides a method of making a food product, comprising (a) freezing a piece of food comprising tofu or wheat gluten; (b) thawing the frozen piece of food; and (c) drying the thawed piece of food in a microwave-vacuum dehydrator to produce a crunchy food product. In one embodiment, the freezing causes the formation of ice crystals within the piece of food and the thawing leaves cavities that were fondled by the ice crystals.

Another aspect of the invention provides a crunchy food product made by the method of the invention.

Further aspects of the invention and features of specific embodiments of the invention are described below.

BRIEF DESCRIPTION OF THE DRAWING

FIG. 1 is a flow chart of a method for making a dried tofu food product according to one embodiment of the invention.

DETAILED DESCRIPTION

According to one embodiment, illustrated in FIG. 1, the method 10 of the invention begins with a piece or block of tofu 12 and produces from it a dried, crunchy and soft food product 26, intended as a shelf-stable snack food. The tofu 12 may be any one of various types of tofu, ranging from silken tofu, having a high moisture content, to extra firm tofu, having a relatively low moisture content, and including fermented tofu and thin sheets of tofu (e.g., 1 to 3 mm thick). The initial moisture content of the various types of tofu is typically in the range of about 70 to 90 wt. %.

The block of tofu 12 is subjected to freezing 14. The freezing of tofu forms ice crystals within the block and these crystals result in the formation of cavities 16. Then, the frozen block is thawed 18, melting the ice crystals and leaving the formed cavities in the block.

The thawed block of tofu may then be divided 20 into smaller pieces, e.g., by cutting into bite-sized cubes that are suitable for a snack food. Optionally, the cutting of the block into bite-sized pieces may instead be done prior to the initial step of freezing 14 the tofu.

The thawed, cut pieces of tofu are then drained 22 to remove any excess water. The need for this step will depend upon the moisture content of the initial block.

Following the removal of any excess water, the pieces of tofu are subjected to drying 24 by means of microwave radiation and reduced pressure in a microwave-vacuum dehydrator. Methods and apparatus for microwave-vacuum drying of food products are well known in the art.

An example of a microwave-vacuum dehydrator that is suitable for drying of the food pieces in the present invention is shown in WO 2009/049409 to Durance et al., and is commercially available from EnWave Corporation of Vancouver, Canada, under the trademark NUTRAREV®. Using this type of apparatus, the tofu pieces are placed for drying in a cylindrical basket that is transparent to microwave radiation and that has openings to permit the escape of moisture. The loaded basket is placed in the vacuum chamber with its longitudinal axis oriented generally horizontally. The pressure in the chamber is reduced. Absolute pressures in the range of about 0.1 to 100 mm of mercury, alternatively 1 to 100, alternatively 10 to 100, alternatively 20 to 50 mm of mercury, may be used. The microwave generator is actuated to radiate microwaves in the vacuum chamber. The basket is rotated within the vacuum chamber, about a generally horizontal axis, so as to slowly and gently tumble the tofu pieces. The rotation of the basket may be effected, for example, by means of rollers on which the basket is supported, or by means of a rotatable cage in which the basket is placed, or by other means.

Another example of a microwave-vacuum dehydrator suitable for carrying out the step of drying is shown in WO 2011/085467 to Durance et al., and is commercially available from EnWave Corporation under the trademark QUANTAREV®. Using this type of apparatus, the tofu pieces are fed into a vacuum chamber and conveyed across a microwave-transparent window on a conveyor belt while being subjected to drying by means of low pressure and microwave radiation. Pressures in the vacuum chamber are within the ranges described above. With this type of apparatus, the tofu pieces are dried while resting on the conveyor belt, and are not subjected to tumbling.

During the microwave-vacuum drying step 24, the cavities in the tofu pieces that were formed during freezing facilitate the rapid escape of water vapor from the tofu pieces and also give a soft, crunchy texture to the product. Once sufficient drying has occurred, for example to a moisture level less than 8 wt. %, alternatively less than 5 wt. %, the radiation is stopped, the pressure in the vacuum chamber is equalized with the atmosphere, and the dried, crunchy tofu product 26 is removed from the microwave-vacuum dehydrator.

The step of drying 24 may be conducted in two stages having different conditions in order to optimize the drying conditions and quality of the product. For example, in the first stage, the microwave power level may be higher than in the second stage; or the pressure, drying time or speed of rotation of the basket (where a rotating basket is employed) may be different. Likewise, more than two drying stages may be employed.

According to another embodiment, the method of the invention makes a dried, crunchy wheat gluten food product. The steps of the method are the same as those described above for the tofu-based products, and illustrated in FIG. 1, except that the starting material is wheat gluten rather than tofu.

Example 1

A block of SUNRISE™ medium tofu, having an initial moisture content of 85 wt. % was frozen in its plastic wrapper at minus 20 degrees C. for 24 hours. It was then completely thawed at room temperature for 5 hours. The thawed tofu block was cut into ¾ inch (1.9 cm) cubes with a cheese cubing device. Excess water was drained from the pieces. 900 grams of the tofu cubes were placed in a perforated polypropylene drying basket, which was placed in a microwave-vacuum chamber having a pair of spaced horizontal rollers for rotation of the basket. The basket was rotated about its longitudinal, horizontal axis at 3 rpm during the drying process. The drying was done at 2000 W of power and an absolute pressure of 20 mm of mercury for a processing time of 30 minutes. The final product temperature in the chamber was about 60 degrees C. The final moisture level of the dried, crunchy tofu pieces was about 3 wt. %.

Example 2

Two blocks of HAPPY TOFU™ firm tofu, having an initial moisture content of 84.5 wt. % were frozen in their plastic wrapper at minus 20 degrees C. for 48 hours. They were then completely thawed at 4 degree C. for 48 hours. The thawed tofu blocks were cut into 2.0 cm cubes with a kitchen knife. Excess water was drained from the pieces. 1290 grams of the tofu cubes were placed in a rotatable drying basket in a microwave-vacuum chamber as in Example 1. The basket was rotated about its longitudinal, horizontal axis at 3 rpm during the first stage of the drying process. This stage of drying was done at 2000 W of power and an absolute pressure of 20 mm of mercury for a processing time of 35 minutes, and then a second stage was done at 1000 W of power and an absolute pressure of 20 mm of mercury for a processing time of 10 minutes at 6 rpm rotation speed. The final product temperature in the chamber was about 95 degrees C. The final moisture level of the dried, crunchy tofu pieces was about 4.4 wt. %.

Example 3

A block of SIX FORTUNE™ fermented, white type tofu, having an initial moisture content of 71.5 wt. % was frozen at minus 20 degrees C. for 24 hours. It was then completely thawed at room temperature for 5 hours. The thawed fermented tofu block was cut into ¾ inch (1.9 cm) cubes. Excess water was drained from the pieces. 865 grams of the fermented tofu cubes were placed in a rotatable drying basket in a microwave-vacuum chamber as in Example 1. The basket was rotated about its longitudinal, horizontal axis at 8 rpm during the drying process. The drying was done at 1000 W of power for a processing time of 30 minutes, followed by 500 W of power for 35 minutes, all at an absolute pressure of 25 mm of mercury. The final weight of the dried, crunchy fermented tofu pieces was 265 grams (a 30 wt. % yield) and the final moisture level was 5.71 wt. %.

Example 4

Blocks of SIX FORTUNE™ fermented, white type and red type tofu were frozen, thawed, cubed and drained, as in Example 3. Drying of the cubes was done in a QUANTAREV™ drying apparatus from EnWave Corporation, using the same microwave power, vacuum chamber pressure and processing times described in Example 3. There was no tumbling during drying. The dried, crunchy, fermented tofu pieces produced were similar to those described in Example 3.

Example 5

Thin sheets of HAPPY TOFU™ smoked tofu having a thickness of about 1 to 3 mm, were marinated and rolled up. Cross-sectional slices having a thickness of ¼ inch (6.4 mm) were cut from the rolls. 720 grams of the slices were frozen, thawed, drained and then dried with tumbling, as in Example 3, except that during the drying step the microwave power was 2000W and the drying time was 1,172 seconds (about 19.5 minutes). The weight of the dried, crunchy product was 255 grams (a 35.4 wt. % yield). The final moisture level was 5.85 wt. %.

Example 6

A soft, dried, crunchy snack product was made using wheat gluten rather than tofu. A block of HAPPY TOFU FIVE SPICE™ chicken analog, comprising wheat gluten, was used. The wheat gluten had an initial moisture content of 65 wt. %. It was frozen and thawed as in Example 3 and cut into 5 mm thick slices. Excess water was drained. 720 grams of the slices of wheat gluten were dried with tumbling as in Example 5, except that the microwave power was 2000 W and the drying time was 1,264 seconds (about 21 minutes). The weight of the dried, crunchy wheat gluten product was 245 grams (a 34% yield). The moisture level of the dried product was 5.10 wt. %.

Example 7

A block of SIX FORTUNE™ fermented, white type tofu was processed as described in Example 3, except that the steps of freezing and thawing were not done. The product was dried, crunchy, fermented tofu pieces having a moisture level of about 5.7 wt. % and was suitable to use as a snack product.

Example 8

Thin sheets of smoked tofu as in Example 5 were processed as described in that example, except that the steps of freezing and thawing were not done. The product was dried, crunchy tofu slices having a moisture level of about 5.85 wt. % and was suitable for use as a snack product.

Example 9

A block of wheat gluten as in Example 6 was processed as described in that example, except that the steps of freezing and thawing were not done. The product was dried, crunchy, fermented wheat gluten pieces having a moisture level of about 5.10 wt. % and was suitable for use as a snack product.

As will be apparent to those skilled in the art in the light of the foregoing disclosure, many alterations and modifications are possible in the practice of this invention without departing from the scope thereof. For example, the block of tofu or wheat gluten can be divided into smaller pieces prior to freezing rather than after thawing. The scope of the invention is to be construed in accordance with the following claims.

The invention claimed is:

1. A method of making a food product, comprising:
   (a) freezing a piece of food comprising one of tofu and wheat gluten;
   (b) thawing the frozen piece of food; and
   (c) drying the thawed piece of food in a microwave-vacuum dehydrator to produce a crunchy food product.

2. A method according to claim 1, wherein step (a) forms ice crystals within the piece of food and step (b) leaves cavities formed by the ice crystals within the piece of food.

3. A method according to claim 1, wherein the piece of food is tofu.

4. A method according to claim 1, wherein the piece of food is wheat gluten.

5. A method according to claim 3, wherein the piece of tofu comprises fermented tofu.

6. A method according to claim 3, wherein the piece of tofu comprises a sheet of tofu having a thickness in the range of 1 to 3 mm.

7. A method according to claim 1, wherein the piece of food of step (a) has an initial moisture content in the range of 60 to 90 wt. %.

8. A method according to claim 1, wherein the piece of food of step (a) has an initial moisture content in the range of 70 to 90 wt. %.

9. A method according to claim 1, wherein an absolute pressure in the dehydrator during step (c) is in the range of 0.1 to 100 mm of mercury.

10. A method according to claim 1, wherein an absolute pressure in the dehydrator during step (c) is in the range of 1 to 100 mm of mercury.

11. A method according to claim 1, wherein an absolute pressure in the dehydrator during step (c) is in the range of 10 to 100 mm of mercury.

12. A method according to claim 1, wherein an absolute pressure in the dehydrator during step (c) is in the range of 20 to 50 mm of mercury.

13. A method according to claim 1, wherein step (c) dries the thawed piece of food to a moisture content less than 8 wt. %.

14. A method according to claim 1, wherein step (c) dries the thawed piece of food to a moisture content less than 5 wt. %.

15. A method according to claim 1 wherein the thawed piece of food contains water, further comprising, after step (b), draining water from the thawed piece of food.

16. A method according to claim 1, wherein step (c) is done in at least two stages and a microwave power level of the microwave-vacuum dehydrator is higher in the first stage than in the second stage.

17. A method according to claim 1, further comprising, after step (b), dividing the thawed piece of food into a plurality of smaller pieces.

18. A method according to claim 17, further comprising, during step (c), tumbling the smaller pieces.

19. A method according to claim 1, further comprising, before step (a), dividing the piece of food into a plurality of smaller pieces.

20. A method for making a dried and porous tofu food product, comprising:
(a) freezing a block of tofu so as to form ice crystals therein;
(b) thawing the frozen block of tofu so as to leave cavities formed by the ice crystals within the block of tofu;
(c) dividing the thawed block of tofu into a plurality of smaller pieces, said pieces of thawed tofu containing water;
(d) draining water from the pieces of thawed tofu; and
(e) drying the thawed, drained pieces of tofu in a microwave-vacuum dehydrator at an absolute pressure in the range of 1 to 100 mm of mercury, to a moisture content that is less than 8 wt. %, producing the dried and porous tofu food product.

* * * * *